(12) United States Patent
Miremadi

(10) Patent No.: US 6,842,232 B2
(45) Date of Patent: Jan. 11, 2005

(54) ELECTRO-OPTICAL DETERMINATION OF TARGET PARAMETERS

(76) Inventor: Reza Miremadi, 8886 Moorcroft Ave., West Hills, CA (US) 91304

( * ) Notice: Subject to any disclaimer, the term of this patent is extended or adjusted under 35 U.S.C. 154(b) by 0 days.

(21) Appl. No.: 10/721,315

(22) Filed: Nov. 25, 2003

(65) Prior Publication Data

US 2004/0105088 A1 Jun. 3, 2004

Related U.S. Application Data

(62) Division of application No. 10/287,372, filed on Nov. 4, 2002, now abandoned.

(51) Int. Cl.[7] ............................. G01C 3/08; A63B 67/02; A63B 57/00
(52) U.S. Cl. ...................... 356/5.01; 473/152; 473/199
(58) Field of Search .................... 356/5.01–5.08, 356/28–28.5; 473/131, 150–156, 180, 198–200, 267, 353

(56) References Cited

U.S. PATENT DOCUMENTS

| | | | | | |
|---|---|---|---|---|---|
| 4,136,387 A | * | 1/1979 | Sullivan et al. | ............. | 473/200 |
| 4,150,825 A | * | 4/1979 | Wilson | ........................ | 473/152 |
| 5,437,457 A | * | 8/1995 | Curchod | ..................... | 473/199 |
| 5,481,355 A | * | 1/1996 | Iijima et al. | ................... | 356/28 |
| 5,568,250 A | * | 10/1996 | Nishiyama et al. | ........... | 356/28 |
| 5,575,719 A | * | 11/1996 | Gobush et al. | ............. | 473/223 |
| 5,833,549 A | * | 11/1998 | Zur et al. | .................... | 473/199 |
| 5,846,139 A | * | 12/1998 | Bair et al. | .................. | 473/156 |
| 5,852,491 A | * | 12/1998 | Kato | .......................... | 356/5.01 |
| 5,926,780 A | * | 7/1999 | Fox et al. | ................... | 702/142 |
| 5,984,794 A | * | 11/1999 | Miremadi | ................... | 473/199 |
| 6,252,655 B1 | * | 6/2001 | Tanaka | ....................... | 356/5.06 |
| 6,285,445 B1 | * | 9/2001 | Winfield et al. | .............. | 356/28 |
| 6,302,802 B1 | * | 10/2001 | Pao | ............................. | 473/156 |
| 6,429,941 B1 | * | 8/2002 | Kamon et al. | .............. | 356/614 |
| 6,579,190 B2 | * | 6/2003 | Yamamoto | .................. | 473/141 |

* cited by examiner

Primary Examiner—Bernarr E. Gregory
Assistant Examiner—Brian Andrea
(74) Attorney, Agent, or Firm—Kirschstein, et al.

(57) ABSTRACT

Electro-optical measurement of distance and motion parameters of a target is obtained with high resolution by employing matched comparators for obtaining differences in arrival times of transmit and receive pulses, and by compensating for time delays introduced by system components.

6 Claims, 5 Drawing Sheets

ELECTRO-OPTICAL DETERMINATION OF TARGET PARAMETERS

This application is a divisional of U.S. application Ser. No. 10/287,372, filed Nov. 4, 200, now abandoned

BACKGROUND OF THE INVENTION

1. Field of the Invention

The present invention generally relates to a system for electro-optically determining parameters of a target, especially a distance to the target and, in the case of a moving target, a direction, velocity and spin thereof.

2. Description of the Related Art

It is known, for example, from my earlier U.S. Pat. No. 5,984,794 to determine flight parameters of a ball in flight by successively pulsing sensors arranged along the flight path at microsecond intervals to obtain multiple, successive linear images of linear sections of the ball and, in turn, reconstructed images of the entire ball on which a pair of reflectors is mounted. The flight parameters are determined by image analysis of the changes in the locations of the images of the reflectors.

It is also known in the prior art to measure distance to a target by measuring a phase difference between transmitted light and reflected light in systems using a continuously modulated sine wave source. However, the maximum current that can be used with a continuously modulated source is limited due to the limited heat dissipation capability of the light source.

SUMMARY OF THE INVENTION

Objects of the Invention

Accordingly, it is a general object of this invention to overcome the drawbacks of prior art systems.

More particularly, it is an object of the present invention to reliably and accurately determine a distance to a target, especially at close ranges of a few feet or less.

Still another object of the present invention is to reliably and accurately determine motion parameters of a moving target, especially a direction, velocity and spin of the target.

FEATURES OF THE INVENTION

In keeping with the above objects and others which will become apparent hereinafter, one feature of the present invention resides, briefly stated, in a system for electro-optically determining distance to a target. The system includes a light emitting diode (LED); means for pulsing the LED with electrical transmit pulses having a predetermined amplitude to direct outgoing light transmissions to the target for reflection therefrom; a photodiode having a field of view in which the target is situated, and operative for detecting incoming light reflections reflected from the target and for generating electrical receive pulses of variable amplitude; and means for conditioning the receive pulses to have an amplitude matching the predetermined amplitude of the transmit pulses to generate conditioned received pulses.

In accordance with this feature of the invention, the system includes a first comparator having a first input to which the transmit pulses are conducted, a second input to which a reference voltage is connected, and a first comparator output; a second comparator having a first input to which the conditioned receive pulses are conducted, a second input to which the reference voltage is connected, and a second comparator output; a logic circuit connected to the outputs of the comparators for determining a difference in arrival times of the transmit pulses and the conditioned receive pulses at the first inputs of the comparators; and a processor for determining a distance to the target as a function of the difference in said arrival times.

Preferably, the conditioning means includes a gating switch for synchronizing the conditioned receive pulses with the transmit pulses, a peak detector for detecting voltages of the conditioned receive pulses, an integrator for integrating the peak voltages, and an automatic gain controller for controlling the amplitude of the integrated peak voltage. It is also preferred when the processor generates a reset signal for resetting the comparators. Still another preference is the use of an isothermal package for housing the system.

In accordance with another feature of this invention, the system is operative for determining motion parameters of a moving target. This system includes a stationary starting platform for supporting the target prior to target movement; an assembly including a light emitting diode pulsed by electrical transmit signals and operative for directing outgoing light to the target for reflection therefrom, and a photodiode having a field of view and operative for detecting incoming light reflected from the target and for generating electrical receive pulses, the assembly defining a reference plane located in and extending along the field of view, the platform being spaced at a known, predetermined spacing from the reference plane; means for determining a difference in arrival times of the transmit and receive pulses, and for determining a distance to the target at the reference plane as a function of the difference in the arrival times; and means for ascertaining a direction of the target relative to the reference plane as a function of said spacing and said distance.

In this embodiment, the ascertaining means includes ascertaining a velocity of the target by consideration of the time taken for a given dimension of the target to pass through the field of view.

Preferably, a reflector is provided on the target for reflecting light to the photodiode. The assembly includes a plurality of light emitting diodes and a plurality of photodiodes arranged in groups, each group being comprised of one light emitting diode and two photodiodes, a first photodiode in each group being operative for detecting reflections from the target, and a second photodiode in each group being operative for detecting reflections from the reflector, and wherein the transmit signals for the light emitting diodes in the groups are spaced timewise apart.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
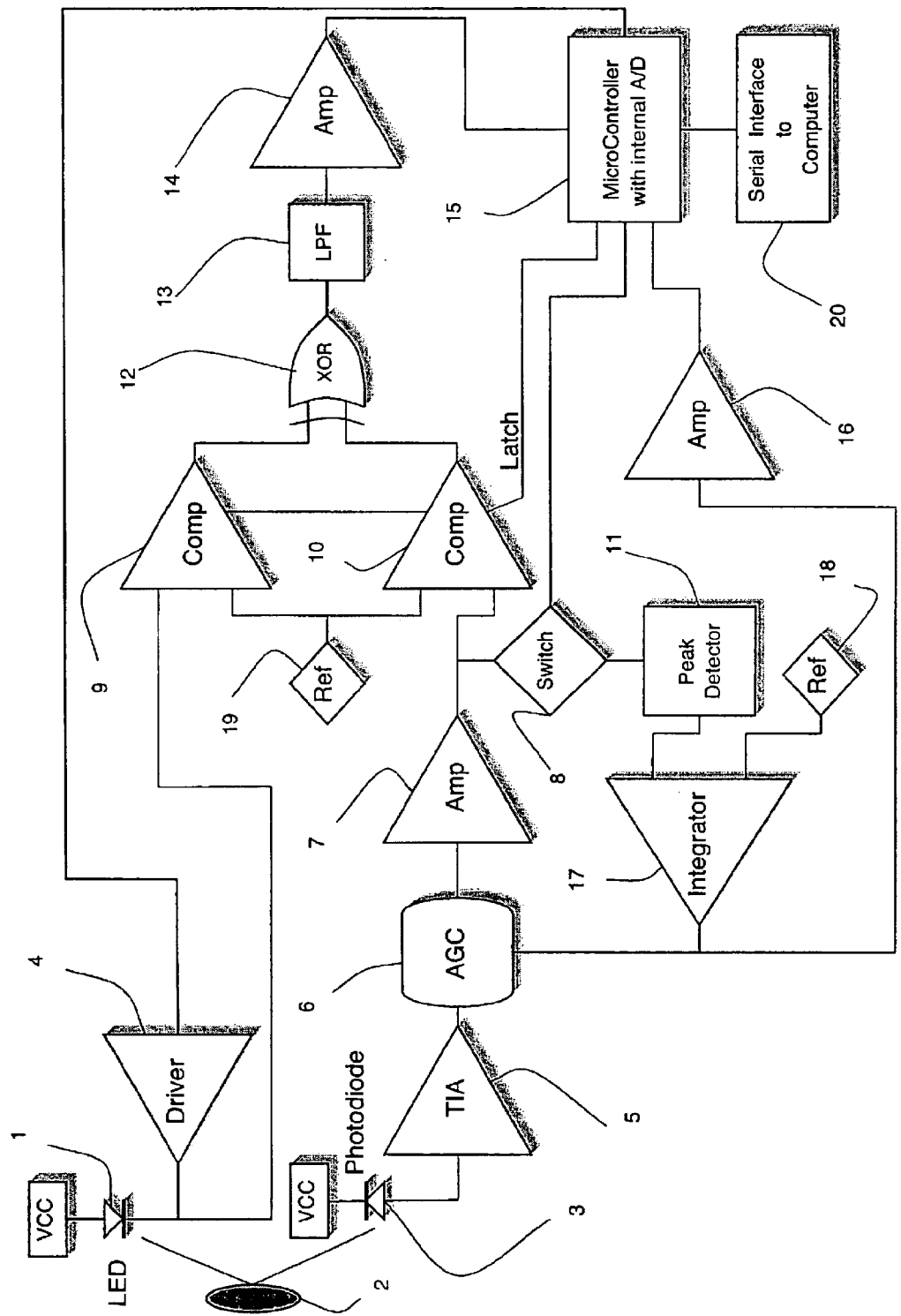
FIG. 1 is a schematic block diagram of a circuit used in a system in accordance with this invention for determining a distance to a target.

Referring now to the drawings, reference numeral 1 identifies a light emitting diode, preferably at a frequency of 850 mm, for emitting light to a target 2 for reflection therefrom. A photodiode 3 has a field of view and detects the reflected light and generates electrical analog signals for processing, as described below.

A microcontroller 15 generates drive pulses that are conducted to a driver 4 and pulse the diode 1 with electrical transmit pulses having a predetermined amplitude at a fixed repetition rate. The driver 4 is preferably an npn transistor with a grounded emitter resistor.

The analog signals generated by the photodiode 3 are receive pulses amplified by a transimpedance amplifier (TIA) 5 which, in the preferred embodiment, has a bandwidth of 40 MHz. The amplified signals are conducted to an automatic gain controller (AGC) 6 and an amplifier 7 which match the variable amplitudes of the receive pulses to the predetermined amplitudes of the transmit pulses. The AGC 6 is a PIN diode attenuator with a bandwidth of 1 GHz in order to pass the receive pulses without any change in the rising edges of the pulses. Amplifier 7 has a bandwidth of 40 MHz.

The transmit pulses from the driver 4 are conducted to one input of a comparator 9, whose other input is connected to a fixed reference voltage level 19 (about 0.1 v). The receive pulses from the amplifier 7 are conducted to one input of a comparator 10, whose other input is connected to the same reference level 19. The comparators are latched together and have respective outputs connected to the dual inputs of an exclusive-OR (XOR) gate 12. Just prior to the receipt of the transmit pulses, the controller 15 resets the latch on the comparators 9, 10 via a pulse on waveform 26 (see FIG. 2). This resets the output of the comparator 9 to a low state (see waveform 21 in FIG. 2), and the output of the comparator 10 to a low state (see waveform 22 in FIG. 2).

The output of the gate 12 is waveform 24 which captures the difference in the arrival time of the transmit and receive pulses. The gate output is then passed through low pass filter (LPF) 13 and amplifier 14 and conducted to the controller 15. Amplifier 14 adjusts for any offsets created by the fixed delay in the path of the receive pulses. The signal fed to the controller is a DC voltage with some ripple as shown by waveform 25. The controller 15 converts the signal to a digital value which represents the distance from the system to the target. The signal is sent away from the system by a serial interface port 20.

The disclosed system is of special benefit in short range distance measurement on the order of a few feet. Since light travels at one foot per nanosecond, such short range measurements have been difficult to make because of the sub-nanosecond resolution and because the reflected receive pulses from the target have a variable amplitude which depends on target distance. The amplitude variation can cause an error which is an order of magnitude greater than the actual distance to be measured. To eliminate this effect, the receive pulses of variable amplitude are conducted to a peak detector 11 and to one input of an integrator 17, whose other input is connected to a fixed voltage reference level 18. The output of the integrator is fed to the AGC 6, as well as to an amplifier 16 and to the controller 15, as an indication of the amount of reflected light which is coming back from the target. Another analog-to-digital conversion occurs inside the controller to digitize the gain and reflected energy data.

Since the transmit and receive pulses being compared at the inputs of comparators 9, 10 have the same amplitude and shape, the difference in the arrival times of these pulses is accurately determined. The time delay through the photodiode 3, TIA 5, AGC 6 and amplifier 7 is compensated for by amplifier 14. Preferably, the system is mounted inside an isothermal package to minimize the variation of this time delay with temperature. The delay introduced by driver 4 is corrected for by taking the pulse from the emitter of the output driver transistor.

Figure 2:
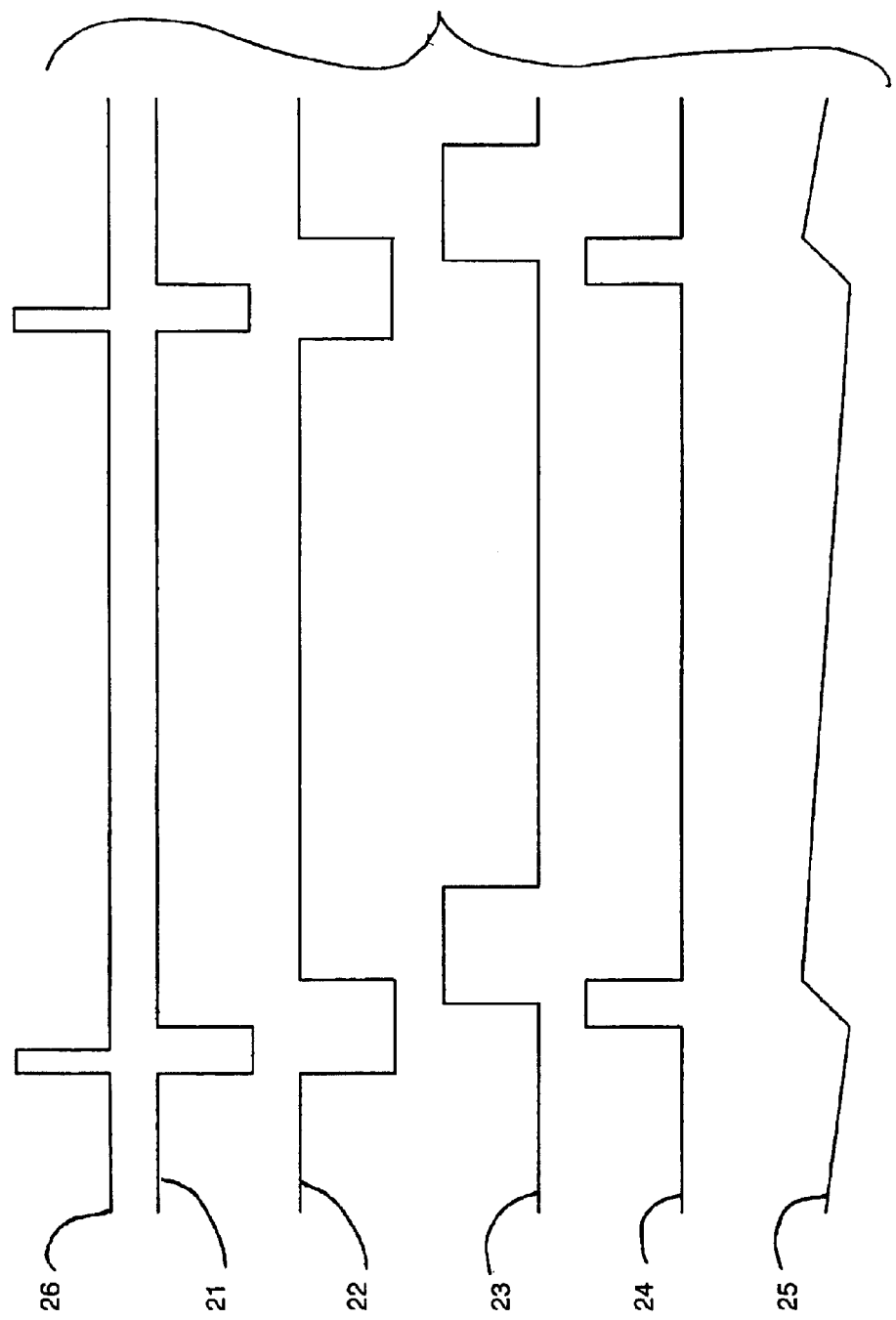
FIG. 2 is a set of waveforms generated in the circuit of FIG. 1.

To further reduce noise and signal interference, the output of the amplifier 7 is gated by a switch 8 controlled by the controller 15. Waveform 23 in FIG. 2 is the gating signal which is synchronized to the transmit pulses. Only correlated transmit and receive pulses are considered in the AGC loop. The correlation between the transmit and receive pulses also allows multiple light sources 1 and multiple sensors 3 having overlapping fields of view to be used, as described below and illustrated in FIG. 8.

The diode 1 and photodiode 3 are physically placed next to each other. Preferably, the photodiode 3 is electromagnetically shielded, together with the TIA 5, by being mounted in a copper housing.

Figure 3:
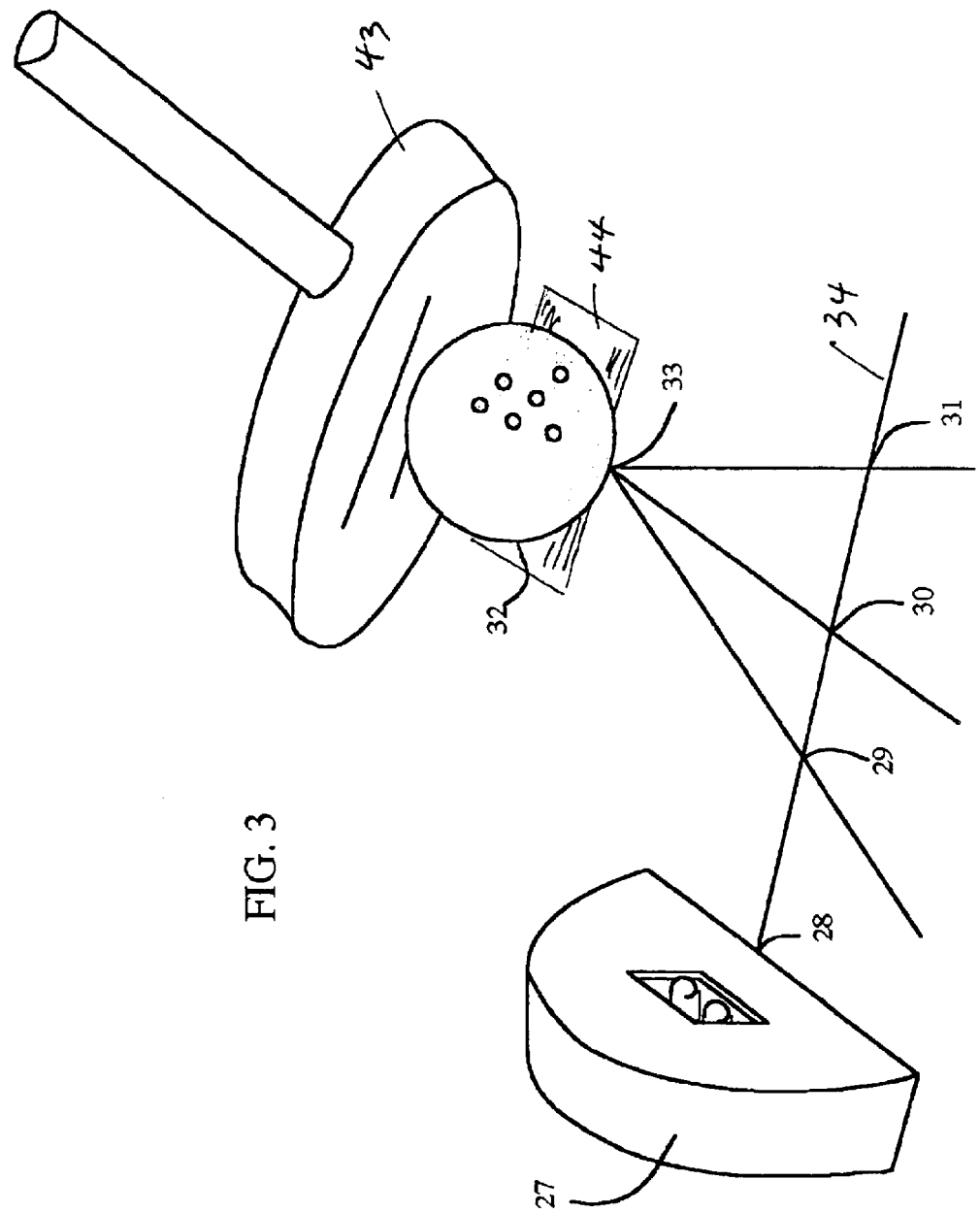
FIG. 3 is a perspective view of a system in accordance with this invention for determining motion parameters of a ball in motion.
Figure 4:
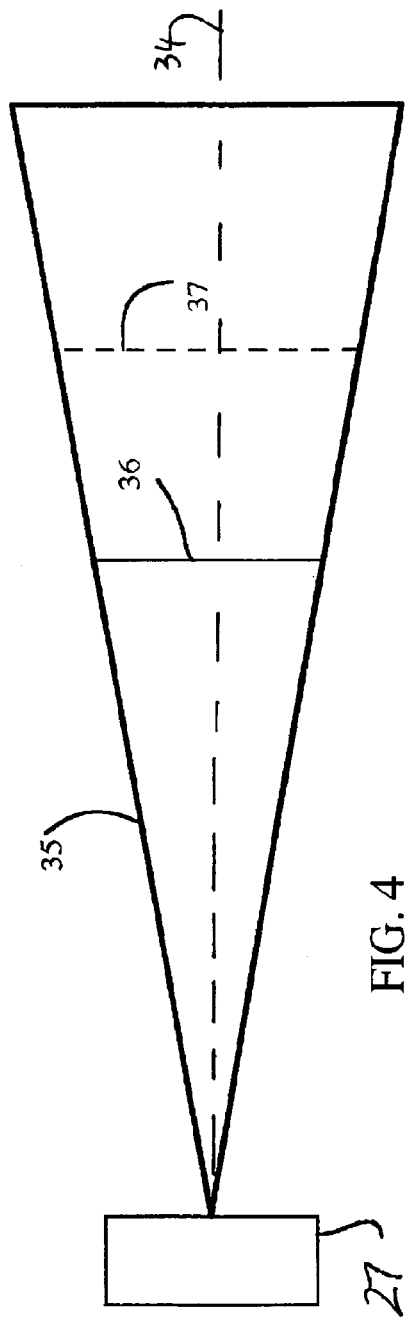
FIG. 4 is a top plan schematic view of the field of view of the system of FIG. 3.

As shown in FIG. 3, a housing 27 contains the system of FIG. 1 in a preferred embodiment for measuring various parameters of a target, in this case, a golf ball 32 initially supported on a stationary platform or tee 44 prior to being struck by a club 43. As shown in FIG. 4, the photodiode 3 within housing 27 has a conical field of view 35 subdivided by a reference plane 34. The tee 44 is located at a known spacing from the reference plane.

When struck, the ball will intersect the reference plane at a certain distance from the housing. If the housing is at point 28, then the ball may cross the reference plane at any point along the reference plane 34, for example, at points 29, 30 or 31. By measuring the distance between points 28, 29 or 28, 30 or 28, 31, the system can calculate the direction of the moving ball as it crosses the reference plane using simple geometry.

Figure 6:
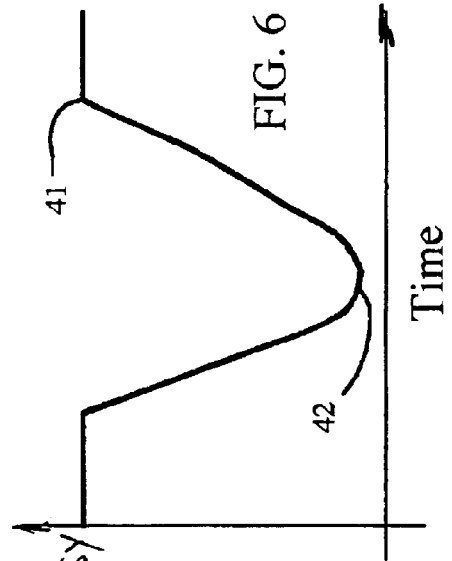
FIG. 6 is a graph of energy versus time used in the system of FIG. 3.
Figure 5:
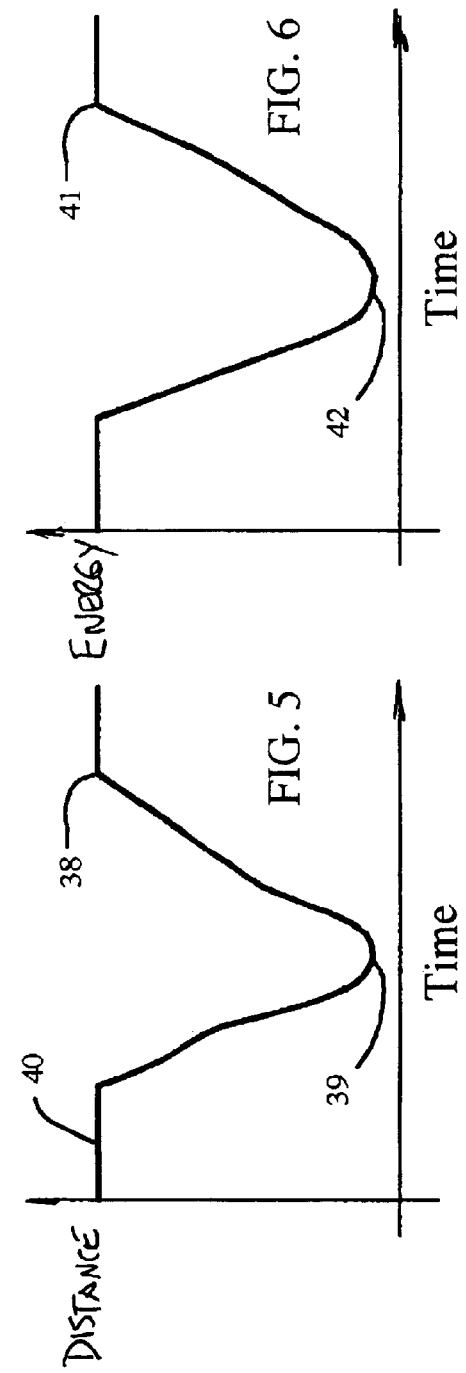
FIG. 5 is a graph of distance versus time used in the system of FIG. 3.

FIG. 5 is a graph of distance versus time, and FIG. 6 is a graph of energy versus time, as the ball 32 crosses the field of view. The minimum point 39 below the points 38, 40 on the distance waveform shows the closest distance from the housing 27 to the ball. This closest distance 39 corresponds to the maximum amount of reflected energy 42 returning to the photodiode.

Returning to FIG. 4, the ball 32 having a circular cross-section completely fills the circular cross-section of the field of view of the photodiode at point 36. At greater distances, for example, at point 37, the time taken for the ball to cross the larger field of view is represented by the difference between points 41 and 42 in FIG. 6. Since the size of the ball is known, the velocity of the ball as it crosses the reference plane is determined by the following equation:

$$\text{velocity} = (\text{dimension of ball})/(T41 - T42)$$

where T41 is the time at point 41, and T42 is the time at point 42, and the dimension is the radius of the ball.

The above equation is valid when the ball crosses the reference plane to the right of point 36 in FIG. 4. If the ball crosses at a point to the left of point 36, then a correction value is factored in. The correction value is a function of the distance to the ball, and the correction function is obtained by taking the convolution of the field of view and the ball at various distances to the left of point 36.

Figure 7:
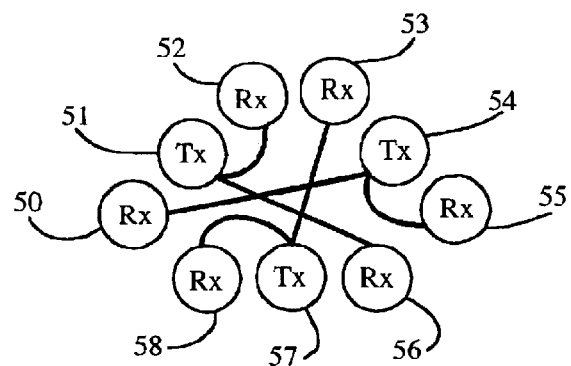
FIG. 7 is a front elevational view of multiple light sources and light sensors used in a variant system in accordance with this invention.

FIG. 7 depicts an arrangement where a plurality of light emitting diodes or transmitters (Tx) 51, 54, 57 and a plurality of photodiodes or receivers (Rx) 52, 56; 50, 55; and 53, 58 are arranged in three groups in order to measure the velocity, direction and spin of the moving ball in three dimensions. All the elements 50-58 are mounted in a common plane in the housing 27. The ball is again launched from a known starting position on tee 44 behind the housing. In this embodiment, a reflector, for example, a 0.1" diameter piece of retro-reflective tape is placed on the center of the ball. It will be noted that the receivers 52, 55, 58 are closer to their respective transmitters 51, 54, 57 as compared to receivers 56, 50, 53.

As the ball crosses the reference plane 34, all six receivers are working. The closer receivers 52, 55, 58 detect the reflector. The further receivers 56, 50, 53 detect the ball. The gain of the reflector is highest when looking from the source of the illumination. Therefore, the receiver closest to its transmitter will predominantly observe the energy reflected from the reflector since this energy is stronger than the energy reflected from the ball. On the other hand, the receiver furthest away from its transmitter will predominantly observe the energy reflected from the ball.

Figure 8:
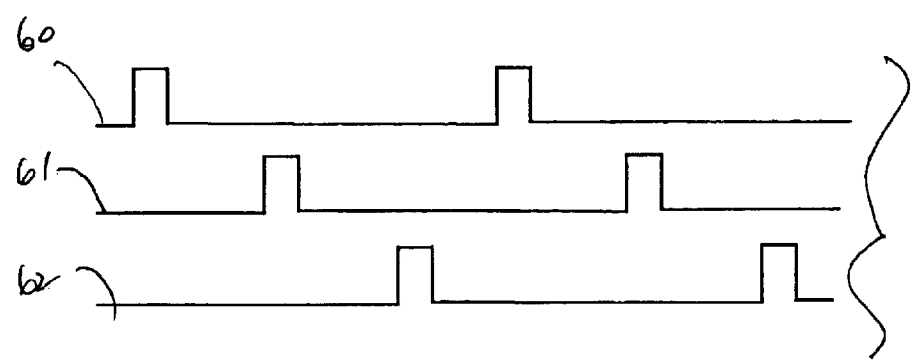
FIG. 8 is a set of waveforms depicting multiplexing of the light sources for use in the system of FIG. 7.

In order for all three transmitters to function without interfering with one another, they are pulsed sequentially as shown in FIG. 8. Thus, pulse waveform 60 for pulsing transmitter 57 is active for transmitting light, while pulse waveforms 61, 62 for pulsing transmitters 53, 58 are off.

The three groups cooperate to measure the distance to the reflector and the ball by triangulation which is a solution of a common point among three intersecting spheres. By following the motion of the ball and the reflector for at least three points in time, enough information is obtained to determine the direction, velocity and spin of the ball.

For further long term stability, a temperature stabilization system comprising a heater, temperature sensor and a closed loop feedback system serves to maintain the temperature of the entire system at a few degrees above the highest expected operating ambient temperature. Any drift caused by component temperature variation is minimized by keeping all the components at the same temperature. The system is capable of distance resolutions of better than 0.1 inches.

It will be understood that each of the elements described above, or two or more together, also may find a useful application in other types of constructions differing from the types described above.

While the invention has been illustrated and described as embodied in an electro-optical determination of target parameters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A system for electro-optically determining motion parameters of a moving target, comprising:
   a) a stationary starting platform for supporting the target prior to target movement;
   b) an assembly including a plurality of light emitting diodes pulsed by electrical transmit signals and each operative for directing outgoing light to the target for reflection therefrom, and a plurality of photodiodes each having a field of view and operative for detecting incoming light reflected from the target and for generating electrical receive pulses, the diodes and photodiodes being arranged in groups, each group comprising one of the diodes and two of the photodiodes, the assembly defining a reference plane located in and extending along the field of view, the platform being spaced at a known, predetermined spacing from the reference plane;
   c) means for determining a difference in arrival times of the transmit and receive pulses, and for determining a distance to the target at the reference plane as a function of the difference in the arrival times;
   d) means for ascertaining a direction of the target relative to the reference plane as a function of said spacing and said distance;
   e) a reflector on the target for reflecting light to the photodiodes; and
   f) wherein a first photodiode in each group is operative for detecting reflections from the target, and a second photodiode in each group is operative for detecting reflections from the reflector, and wherein the transmit signals for the light emitting diodes in the groups are spaced timewise apart.

2. The system of wherein the ascertaining means includes ascertaining a velocity of the target by consideration of the time taken for a given dimension of the target to pass through the field of view.

3. The system of claim 1, wherein the target is a golf ball, and wherein the platform is a tee.

4. The system of claim 1, wherein the assembly is mounted in a housing.

5. The system of claim 1, wherein the reflector is a piece of retro-reflective tape.

6. The system of claim 1, wherein there are three groups.

* * * * *